Nov. 5, 1957 W. S. PATRICK 2,812,393

POWER SUPPLY AND BIAS ARRANGEMENT FOR
PUSH-PULL TRANSISTOR AMPLIFIER
Filed Oct. 6, 1954

WILLIAM S. PATRICK
*INVENTOR.*

BY Francis W. Crotty

HIS ATTORNEY.

United States Patent Office 2,812,393

Patented Nov. 5, 1957

2,812,393

POWER SUPPLY AND BIAS ARRANGEMENT FOR PUSH-PULL TRANSISTOR AMPLIFIER

William S. Patrick, Chicago, Ill., assignor to Zenith Radio Corporation, a corporation of Illinois Application October 6, 1954, Serial No. 460,695

8 Claims. (Cl. 179—171)

Figures 1, 2, 3, 4:
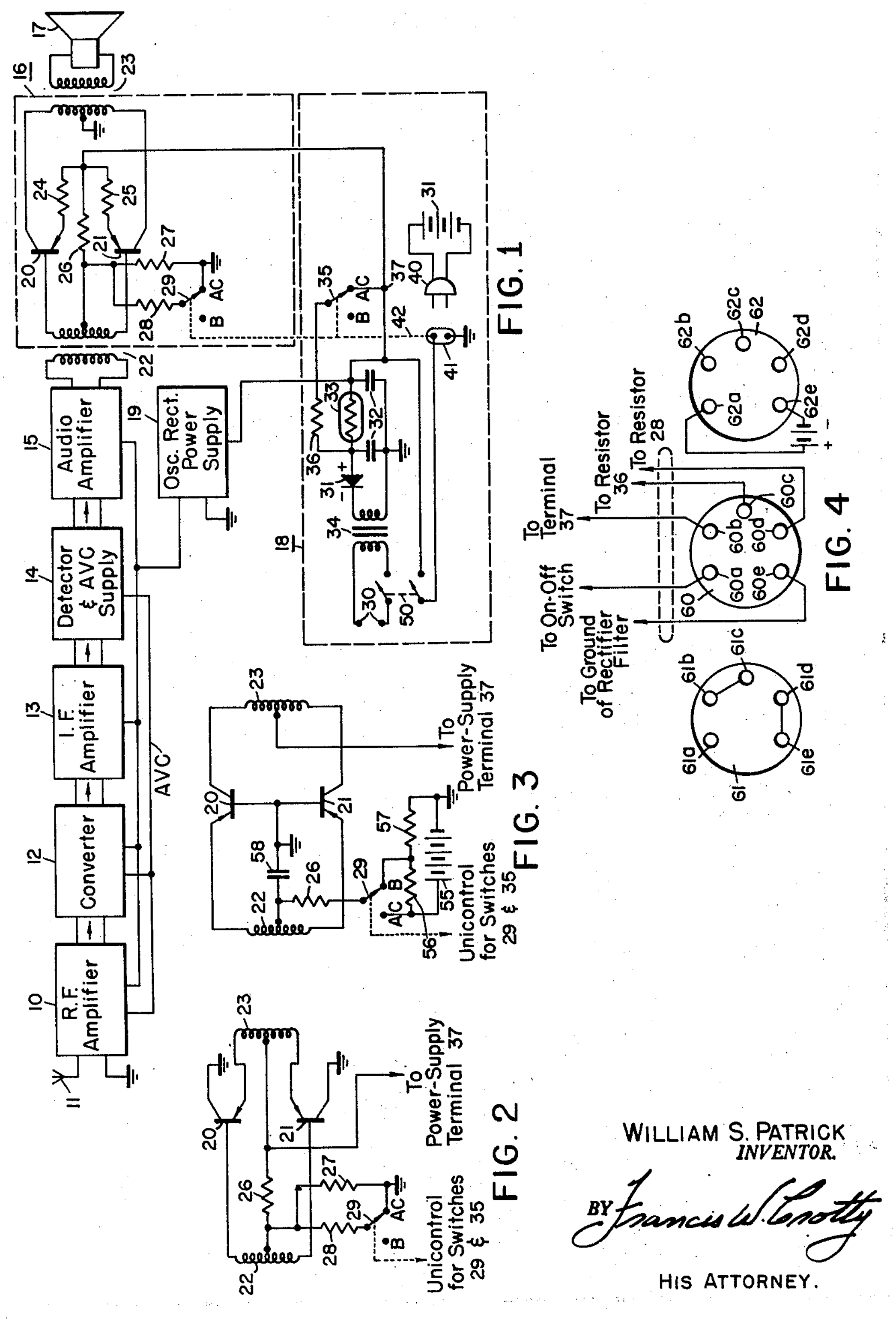

This invention is directed to a push-pull transistor amplifier and concerns more particularly the power supply and biasing arrangement for such an amplifier.

The advantages of push-pull amplifiers, notably the reduction in harmonic distortion, are well understood and lead to their use as final or output amplifiers in audio systems. They may for example be advantageously employed as the final audio stage of a wave-signal or radio receiver. And, of course, in that environment either vacuum tubes or transistors may serve as the amplifying vehicle although the demands imposed on the driver stage by the input impedance characteristics of vacuum-tube amplifiers are avoided or minimized with transistors, which is a decidedly attractive attribute in the development of portable receivers. Obviously, such receivers must be constructed for operation alternatively from an unregulated commercial power source or from self-contained batteries if the customer is to derive full advantage from the portable instrument.

Where the transistor amplifier is to be energized from an unregulated power source, it is convenient and certainly most economical to arrange it as a class A amplifier. Such an amplifier is characterized by a substantially constant current drain and the power supply, being unregulated, is relatively inexpensive and usually has a high impedance. It exhibits large swings or fluctuations in terminal voltage over a range of operating conditions but is entirely satisfactory since the current is essentially constant. On the other hand, where such an amplifier is to operate from a battery, other considerations, principally the relatively high cost of power supplied from batteries, render class A operation impractical and favor class B. However, the circuit conditions associated with a class B amplifier, such as the impedance of the power source and the bias of the transistors, are sufficiently different from those of class A that these two kinds of amplification appear to impose incompatible requirements and cause the conversion from one to the other to be inconvenient, at least as proposed heretofore. Of course, transistors are noted for their conservation of battery power but the wide variations of current incident to class B operation preclude effective use of the relatively inexpensive but high-impedance power supply characteristic of class A operation because variations in the terminal voltage of the supply would, in the face of the extreme fluctuations of current, seriously impair the quality of the amplifier output.

Accordingly, it is an object of the invention to provide a new and improved push-pull transistor amplifier which may conveniently and efficiently be operated alternatively from an unregulated commercial power source or from a battery.

A further object of the invention is to provide an improved arrangement for such an amplifier to facilitate its automatic conversion in respect of power supply impedances and operating biases of the transistors to make most effective use of the power source to be employed at any given time.

It is a more specific object of the invention to arrange such an amplifier for efficient operation from a commercial but unregulated power source, from a battery or from both concurrently.

A push-pull transistor amplifier to be energized alternatively from a battery or from an unregulated commercial power supply, when constructed in accordance with the invention, comprises a pair of transistors individually having input electrodes and output electrodes. An input circuit is coupled to the input electrodes of both transistors for applying signals thereto in push-pull relation, and an output circuit coupled to their output electrodes derives an amplified replica of the applied signal therefrom. The power supply of the amplifier has a first operating condition in which the amplifier is arranged for energization from an unregulated power source and has a second operating condition in which the amplifier is arranged for energization from a battery. There is a bias circuit for the amplifier, likewise having a first operating condition in which the transistors are biased for class A operation and having a second operating condition in which they are biased for class B operation. Finally, a unicontrol means is provided to establish the power supply and bias circuit in their aforesaid first positions and to selectively and concurrently establish both in their aforesaid second positions.

In accordance with one feature of the invention the operating conditions of the power supply and the bias circuit are established upon the selective actuation of two-position switches and these switches are interconnected to operate together. In another form, the operating conditions are imposed by selectively homing a multi-terminal plug, connected in circuit with the power supply and the bias network, within a chassis receptacle or a battery receptacle. These receptacles complete different circuits to establish the necessary conditions.

It is convenient to refer to the amplifying devices by the term "transistor" although that expression is here employed in a more generic sense to include the class of multi-electrode semi-conductor devices employed for amplification. They may be of the point-contact or junction type and, if of the latter, may be n-p-n, p-n-p or the like. Of course, the specific nature of the semi-conductor device, particularly where it is of the junction type, has a direct bearing on the polarity of the energizing source, as is well understood in the adaptation of such devices to amplifying circuits; for convenience the illustrated embodiments employ transistors of the p-n-p junction type.

The features of the present invention which are believed to be novel are set forth with particularity in the appended claims. The invention, together with further objects and advantages thereof, may best be understood, however, by reference to the following description taken in connection with the accompanying drawing, in the several figures of which like reference numerals indicate like elements, and in which:

Figure 1 is a representation, partly schematic, of a wave-signal receiver embodying a push-pull transistor amplifier constructed in accordance with the invention;

Figures 2 and 3 individually show different circuit arrangements for the transistors in such an amplifier; and Figure 4 represents a further embodiment of the invention.

Referring now more particularly to Figure 1, the receiver there represented will be considered as a portable instrument arranged to be operated alternatively from an unregulated commercial power source such as the usual household power supply or from a battery, the latter making possible the operation of the instrument in beach locations and the like where no commercial power source is available. As illustrated, the receiver comprises a radio-frequency amplifier 10 of any desired number of stages having an input circuit connected to an antenna 11 which in the normal case is incorporated as a loop within the portable instrument. Connected in cascade to the output circuit of amplifier 10 is a converter 12, considered as including its own heterodyning oscillator, an intermediate-frequency amplifier 13 of any desired number of stages, a detector and automatic volume control (AVC) supply 14 and an audio amplifier 15 which may include stages of power as well as voltage amplification. There is a final or output audio stage 16, to be described more particularly hereinafter, connected to the output of audio amplifier 15 and, in turn, energizing a signal reproducer or loudspeaker 17. An AVC bus extends from the AVC supply of stage 14 to the input or bias circuits of R. F. amplifier 10 and converter 12 to apply a control potential thereto and maintain the intensity of signals applied to the input of audio amplifier 15 within a relatively narrow range of variations in spite of variations of a received signal in a manner well understood in the art. Of course, the receiver has a power supply for energizing all of its stages but inasmuch as the present invention is concerned primarily with the power supply for the final audio amplifier 16, only that supply 18 has been illustrated in detail. In the construction of an instrument of the type under consideration, the power supply 19 for stages 10–15, particularly if they employ vacuum tubes as distinguished from transistors, may take the form of an oscillator operating in the frequency range of 15–20 kilocycles and a rectifier for rectifying the generated oscillations to develop a unidirectional operating potential of sufficient magnitude. Transistor-type oscillators are thoroughly known and it is most convenient to use the transistor oscillator in the case at hand since power supply 18 may concurrently be employed to energize the transistor of such an oscillator type of power supply.

Except for specific features of amplifier 16 and its associated power supply 18 to be explained presently, the receiver is of conventional design and its construction and operation are well understood in the art. Briefly, a wave signal intercepted by antenna 11 and selected by appropriate tuning of amplifier 10 and converter 12 is amplified in stage 10 and converted in converter 12 to an intermediate frequency suitable for acceptance by intermediate-frequency amplifier 13. After amplification therein, it is supplied to and detected in detector 14 and then delivered to audio amplifier 15—16 for further and final amplification. Following that amplification, the signal is applied to the speaker coil of sound reproducer 17 to effect sound reproduction.

Referring now more particularly to stages 16 and 18, amplifier 16 comprises a pair of three-electrode transistors 20 and 21 arranged in a push-pull amplifier circuit to be energized alternatively from an unregulated commercial power source or from a battery. Each transistor has input electrodes and output electrodes and is operated with the emitter maintained substantially at signal ground potential. An input circuit is coupled to the input electrodes for applying signals to the transistors in push-pull relation, the input circuit comprising a coupling transformer 22. The primary winding of the coupling transformer is connected to the output terminals of audio amplifier 15 while opposite terminals of the secondary winding are connected to the base electrodes of the transistors. In similar fashion, an output circuit is coupled to the output electrodes for deriving, in push-pull fashion, an amplified replica of the applied signal. This output circuit includes a coupling transformer 23 the primary winding of which has a grounded center tap. The opposite terminals of this winding connect to the collector electrodes of the transistors while the secondary winding of coupling transformer 23 is connected to the speaker coil of sound reproducer 17. The emitter circuits of the transistors include stabilizing resistors 24 and 25 having a common junction which is connected through a resistor 26 to a center tap of the secondary winding of coupling transformer 22. The emitters are also connected in a bias circuit which extends from resistor 26 through a resistor 27 to ground. The amount of bias current may be adjusted as required to convert the stage operation from class A to class B by means of a further resistor 28 which may be selectively coupled in shunt relation to resistor 27 through a switch 29. In a first operating position wherein switch 29 engages contact AC, the shunt connection is completed, the transistors achieve a predetermined high current bias and the stage is adjusted for class A operation. In the second operating position of the switch in which its movable element engages the contact B, the shunt connection is broken, the bias current is reduced in magnitude and the operation of the stage is converted to class B.

As indicated previously, the power supply is arranged to permit energization of the transistors from an unregulated power source which may be connected to input terminals 30 or from a battery 31. The AC supply is converted to the necessary unidirectional operating potential through a rectifier-filter network comprising a selenium or other rectifier 31. The polarity of the rectifier connection in the circuit is dependent on the type of transistor employed; for transistors of the p-n-p type in the signal-grounded emitter circuit of Figure 1, the rectifier is poled as indicated to provide a positive unidirectional voltage at point 37. The filter consists of shunt-connected filter condensers 32, 32 and a series resistor which preferably is a ballast tube 33 here serving the additional function of a series-connected current limiting impedance to protect the battery under operating conditions to be explained hereinafter. A power transformer 34 couples the input terminals 30 to the rectifier-filter network.

To facilitate choice of power source as the requirements demand, unit 18 further includes a two-position changeover mechanism, here illustrated as a switch 35 which has a first operating position in which it engages terminal AC for energizing amplifier 16 from the rectifier-filter network. With the switch in this position a voltage-stabilizing impedance 36 is connected in shunt with ballast tube 33 so that the voltage presented at terminal 37 of the rectifier-filter network has the proper value, for example 9 volts. The second position of the switch, established when its movable element engages terminal B, conditions the amplifier for energization from battery 31 alone or, if desired, from this battery and the AC source concurrently. And in this position, the switch disconnects impedance 36 from the power supply. Obviously, for battery 31 to be effective, the plug termination 40 of the battery cable must be inserted into jack 41 connecting the battery in parallel with the rectifier-filter network.

Unicontrol means interconnect changeover switch 35 of power supply 18 with the bias determining switch 29 of amplifier 16 to establish both in their first described positions for operation from a commercial power source and to selectively and concurrently actuate both to their second described positions for battery operation. This unicontrol means is shown schematically by broken construction lines 42. Physically, it may constitute a plunger of insulating material slidably supported within battery socket 41 and disposed to engage a switch actuator upon the insertion of battery plug 40 to displace both switches from a normal position in which they contact their terminals AC to their second positions in which they contact the alternate terminals B.

There is an on-off switch 50 in the receiver which has two switch blades mechanically interconnected for concurrent actuation. One is in the primary circuit of power transformer 34 and other other is in series arrangement with battery socket 41. If the switch is opened, both the rectifier network and the battery input are disabled but if it is closed, both power circuits are conditioned to energize the receiver.

Considering now more specifically the operation of amplifier 16 and its power supply 18, it will be assumed initially that there is no battery physically within the set and that the battery cable and plug 40 have been disconnected from socket 41. For the described conditions, switches 29 and 35 engage their AC terminals and assuming, of course, that a commercial source is connected with input terminals 30 the amplifier is energized for operation from that source through rectifier-filter 31—33. The rectifier-filter is an inexpensive and well-known structure which provides the required unidirectional operating potential, and impedance 36 is chosen to adjust the load condition of the supply so that the terminal voltage is a required predetermined value. Moreover, the transistors receive a predetermined high biasing current by virtue of their connection through resistive network 26—28 to the power supply and bias the transistors for class A operation. An applied signal is amplified in the usual way and an amplified replica thereof energizes loudspeaker 17.

When battery 31 is present and the plug termination of its cable is inserted into socket 41, both switches 29 and 35 are displaced to their alternate positions. In this condition, battery 31 is effectively in parallel across the output circuit of the rectifier-filter but it will be assumed that the rectifier has been disconnected from the AC source so that operation is entirely from the battery. The power supply is now inherently a low-impedance circuit and with switch 29 engaging contact B the bias circuit of the transistors is modified, reducing the bias current and establishing a condition of class B operation which is desirable in the interests of battery economy.

In the third and final condition of operation, battery 31 is functionally included in the power supply circuit as just described and an AC source may be assumed to be connected to terminals 30. This is equivalent to operation from the battery alone so far as the bias condition of the amplifier and impedance characteristic of the power supply are concerned. Because it is connected across the output of rectifier-filter network 31—33, however, the battery is partially recharged from the rectified AC power source. No harm is suffered by the battery provided the impedance-current characteristic of ballast tube 33 maintains the voltage per cell of the battery below a predetermined upper limit dependent on the construction of the cell, e. g., of the order of 1.8 volts for a battery constructed of conventional 1.5-volt Le Clanché type dry cells.

While in the embodiment of Figure 1 the transistors are operated with signal-grounded emitters, it is also possible to ground either of the other electrodes. In Figure 2, for example, the circuit is shown for a push-pull transistor amplifier in which the collector electrodes are established at ground potential. The circuit is otherwise generally similar to that of Figure 1 and corresponding components thereof are identified by the same reference characters.

In the arrangement of Figure 3 the base electrodes of the transistors are established at ground potential and, for convenience, the current bias is derived from a separate battery 55 across which is connected a voltage divider of resistors 56 and 57. The AC terminal of switch 29 is connected to one side of the battery and the B terminal of the switch connects with the junction of resistors 56 and 57. Moreover, a condenser 58 blocks the bias circuit with respect to ground. Otherwise, the circuit is similar to that of Figure 1 and corresponding components are identified by like reference characters, although the polarity of the power supply is reversed in the arrangement of Figure 3; specifically the polarity of terminal 37 is negative.

The switch and unicontrol arrangement of Figure 1 may likewise take any of a variety of forms and in particular may be replaced by the plug-socket system of Figure 4. In this case, battery socket 41 of Figure 1 is replaced by a five terminal plug 60 which may be selectively received by a chassis receptacle 61 or by a battery receptable 62. The asymmetrical arrangement of prongs **60*a*—60*e* on plug 60 and of prong-sockets 61*a*—61*e* and 62*a*—62*e* in receptacles 61 and 62, respectively, make it possible for plug 60 to be received in only one position in either receptacle 61 or receptacle 62**.

In connecting plug 60 into the power supply and bias circuits of Figure 1, prong **60*a* connects one section of the on-off switch 50 in series with ballast tube 33; prong 60*b* connects to power supply terminal 37; prong 60*c* connects to the free terminal of resistor 36; prong 60*d* connects to the free terminal of resistor 28 and prong 60*e* connects to the ground bus of the filter-rectifier. Socket 61 has internal connections as shown from terminal 61*b* to 61*c* and from terminal 61*d* to 61*e*. In like fashion, socket 62 has circuit connections although they differ from those of socket 61. More particularly, a battery is connected between terminals 62*a* and 62*e*** whereas the remaining terminals do not extend the jack terminals, circuitwise.

Obviously, when the cable terminating in plug or jack 60 is received by socket 61, only the power source applied to terminals 30 energizes the amplifier. Resistor 36 is in the circuit across tube 33 and resistor 28 is in shunt with resistor 27 to bias the amplifier for class A operation. If plug 60 is inserted into battery receptacle 62, resistors 28 and 36 are disconnected and the amplifier is biased for class B operation. In this condition the amplifier is energized by the battery alone, or by the rectifier filter with the battery floating thereacross depending on whether or not the commercial source is applied to terminals 30.

The described push-pull transistor amplifier is especially suited for inclusion in a portable radio receiver because of its effectiveness when energized from either an unregulated commercial AC source or from a battery. The arrangement features the automatic conversion of the amplifier between class A and class B operation in order that most efficient use may be made of the effective power supply for any given condition. Further, the circuit has the distinct advantage over corresponding vacuum tube push-pull amplifiers that the input impedance of the amplifier is not changed significantly whether it functions in class A or class B so that it is not necessary to modify the driver stage as the conversion is made from one class to the other. With vacuum tube amplifiers there is a sharp change in input impedance with a conversion from class A to class B which necessitates a change in the driver stage if the output of the amplifier is not to be impaired.

There is an additional advantage realized with the described arrangement in that no harm is occasioned by connecting the rectifier filter to an AC source even with the battery cable connected. Accordingly, no precautions need be provided to disconnect the battery when AC operation is contemplated even though this is a necessary precaution with prior battery/AC operated radio receivers employing vacuum tubes. In fact, in the described circuit there is a positive advantage in that the battery is partially recharged during AC operation. The ballast tube 33, while it protects the battery during AC operation by limiting the voltage per cell, permits the set to operate over a much wider range of fluctuations in the AC power source than otherwise which further enhances the utility of the described amplifier-power supply arrangement.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. A push-pull transistor amplifier to be energized alternatively from a battery or from an unregulated commercial power source comprising: a pair of transistors individually having input electrodes and output electrodes; an input circuit coupled to said input electrodes of said transistors for applying signals thereto in push-pull relation; an output circuit coupled to said output electrodes of said transistors for deriving an amplified replica of the applied signal therefrom; a power supply including a changeover switch which in a first operating position couples said amplifier to said unregulated power source and in a second position couples said amplifier to said battery; a bias circuit for said amplifier including a switch having a first operating position in which said transistors are biased for class A operation and having a second operating position in which said transistors are biased for class B operation; and a unicontrol means coupled to said switches to establish both in their aforesaid first positions and to selectively and concurrently actuate both switches to their aforesaid second positions.

2. A push-pull transistor amplifier to be energized alternatively from a battery or from an unregulated commercial power source comprising: a pair of transistors individually having input electrodes and output electrodes; an input circuit coupled to said input electrodes of said transistors for applying signals thereto in push-pull relation; an output circuit coupled to said output electrodes of said transistors for deriving an amplified replica of the applied signal therefrom; a rectifier-filter network, having an input terminal adapted for coupling to said unregulated power source, for developing a unidirectional operating potential by rectifying an alternating current from said unregulated power source; a changeover switch which in a first operating position couples said amplifier to an output terminal of said rectifier-filter network and in a second position couples said amplifier to said battery; a bias circuit for said amplifier including a switch having a first operating position in which said transistors are biased for class A operation and having a second operating position in which said transistors are biased for class B operation; and a unicontrol means coupled to said switches to establish both in their aforesaid first positions and to selectively and concurrently actuate both switches to their aforesaid second positions.

3. A push-pull transistor amplifier to be energized alternatively from a battery or from an unregulated commercial power source comprising: a pair of transistors individually having input electrodes and output electrodes; an input circuit coupled to said input electrodes of said transistors for applying signals thereto in push-pull relation; an output circuit coupled to said output electrodes of said transistors for deriving an amplified replica of the applied signal therefrom; a rectifier-filter network, having an input terminal adapted for coupling to said unregulated power source, for developing a unidirectional operating potential by rectifying an alternating current from said unregulated power source; means for connecting said battery in parallel with said network; a changeover switch which in a first operating position couples said amplifier to an output terminal of said rectifier-filter network and in a second position couples said amplifier to said battery; a bias circuit for said amplifier including a switch having a first operating position in which said transistors are biased for class A operation and having a second operating position in which said transistors are biased for class B operation; and a unicontrol means coupled to said switches to establish both in their aforesaid first positions and to selectively and concurrently actuate both switches to their aforesaid second positions.

4. A push-pull transistor amplifier to be energized alternatively from a battery or from an unregulated commercial power source comprising: a pair of transistors individually having input electrodes and output electrodes; an input circuit coupled to said input electrodes of said transistors for applying signals thereto in push-pull relation; an output circuit coupled to said output electrodes of said transistors for deriving an amplified replica of the applied signal therefrom; a rectifier-filter network, having an input terminal adapted for coupling to said unregulated power source, for developing a unidirectional operating potential by rectifying an alternating current from said unregulated power source; means for connecting said battery in parallel with said network; a series-connected current-limiting impedance included in said network; a changeover switch which in a first operating position couples said amplifier to an output terminal of said rectifier-filter network and in a second position couples said amplifier to said battery, said current-limiting impedance having an impedance-current characteristic such that the voltage per cell applied to said battery from said network is maintained less than a predetermined value; a bias circuit for said amplifier including a switch having a first operating position in which said transistors are biased for class A operation and having a second operating position in which said transistors are biased for class B operation; and a unicontrol means coupled to said switches to establish both in their aforesaid first positions and to selectively and concurrently actuate both switches to their aforesaid second positions.

5. A push-pull transistor amplifier to be energized alternatively from a Le Clanché-cell type of battery or from an unregulated commercial power source comprising: a pair of transistors individually having input electrodes and output electrodes; an input circuit coupled to said input electrodes of said transistors for applying signals thereto in push-pull relation; an output circuit coupled to said output electrodes of said transistors for deriving an amplified replica of the applied signal therefrom; a rectifier-filter network, having an input terminal adapted for coupling to said unregulated power source, for developing a unidirectional operating potential by rectifying an alternating current from said unregulated power source; means for connecting said battery in parallel with said network; a series-connected ballast tube included in said network; a changeover switch which in a first operating position couples said amplifier to an output terminal of said rectifier-filter network and in a second position couples said amplifier to said battery, said ballast tube having an impedance-current characteristic such that the voltage per cell applied to said battery from said network is maintained less than approximately 1.8 volts; a bias circuit for said amplifier including a switch having a first operating position in which said transistors are biased for class A operation and having a second operating position in which said transistors are biased for class B operation; and a unicontrol means coupled to said switches to establish both in their aforesaid first positions and to selectively and concurrently actuate both switches to their aforesaid second positions.

6. A push-pull transistor amplifier to be energized alternatively from a battery or from an unregulated commercial power source comprising: a pair of transistors individually having input electrodes and output electrodes; an input circuit coupled to said input electrodes of said transistors for applying signals thereto in push-pull relation; an output circuit coupled to said output electrodes of said transistors for deriving an amplified replica of the applied signal therefrom; a rectifier-filter network, having an input terminal adapted for coupling to said unregulated power source, for developing a unidirectional operating potential by rectifying an alternating current from said unregulated power source; means for connecting said battery in parallel with said network; a series-connected current-limiting impedance included in said network; a voltage-stabilizing impedance; a changeover switch which in a first operating position connects said voltage-stabilizing impedance in shunt relation with said current-limiting impedance and couples said amplifier to an output terminal of said rectifier-filter network and in a second position disconnects said voltage-stabilizing impedance and couples said amplifier to said battery, said voltage-stabilizing impedance having a value chosen to establish a preselected terminal voltage for said network and said current-limiting impedance having an impedance-current characteristic such that the voltage per cell applied to said battery from said network is maintained less than a predetermined value; a bias circuit for said amplifier including a switch having a first operating position in which said transistors are biased for class A operation and having a second operating position in which said transistors are biased for class B operation; and a unicontrol means coupled to said switches to establish both in their aforesaid first positions and to selectively and concurrently actuate both switches to their aforesaid second positions.

7. A push-pull transistor amplifier to be energized alternatively from a battery or from an unregulated commercial power source comprising: a pair of transistors individually having input electrodes and output electrodes; an input circuit coupled to said input electrodes of said transistors for applying signals thereto in push-pull relation; an output circuit coupled to said output electrodes of said transistors for deriving an amplified replica of the applied signal therefrom; a power supply having a first operating condition in which said amplifier is coupled to said unregulated power source and having a second operating condition in which said amplifier is coupled to said battery; a bias circuit for said amplifier having a first operating condition in which said transistors are biased for class A operation and having a second operating condition in which said transistors are biased for class B operation; and unicontrol means for establishing said power supply and said bias circuit in their aforesaid first operating conditions and to selectively and concurrently establish both in their aforesaid second operating conditions.

8. A push-pull transistor amplifier to be energized alternatively from a battery or from an unregulated commercial power source comprising: a pair of transistors individually having input electrodes and output electrodes; an input circuit coupled to said input electrodes of said transistors for applying signals thereto in push-pull relation; an output circuit coupled to said output electrodes of said transistors for deriving an amplified replica of the applied signal therefrom; a power supply having a first operating condition in which said amplifier is coupled to said unregulated power source and having a second operating condition in which said amplifier is coupled to said battery; a bias circuit for said amplifier having a first operating condition in which said transistors are biased for class A operation and having a second operating condition in which said transistors are biased for class B operation; a first connector having terminal elements connected in circuit with said power supply and with said bias circuit; means including a second connector for selectively mating with said first connector to complete connections therethrough and establish said power supply and said bias circuit in their aforesaid first operating conditions; and means including a third connector for alternatively mating with said first connector to complete different connections therethrough and establish said power supply and said bias circuit in their aforesaid second operating conditions.

References Cited in the file of this patent

UNITED STATES PATENTS

| | | |
|---|---|---|
| 2,220,051 | Israel et al. | Oct. 29, 1940 |
| 2,222,196 | Vilkomerson | Nov. 19, 1940 |

OTHER REFERENCES

Shea text, "Principles of Transistor Circuits," pages 132–136, 148–149, pub. 1953 by John Wiley & Sons, Inc.